US005305080A

United States Patent [19]

Lee et al.

[11] Patent Number: 5,305,080

[45] Date of Patent: Apr. 19, 1994

[54] APPARATUS FOR INSPECTING SURFACE OF A FACE PLATE FOR A CATHODE RAY TUBE

[75] Inventors: Sangsoo Lee; Nagkeun Seong; Sangkeun Jeong; Boghyeon Yoo; Koonseon Oh; Jeongin Seo; Jaekyeong Rho, all of Kyunggi, Rep. of Korea

[73] Assignee: Samsung Corning Co., Ltd., Kyunggi, Rep. of Korea

[21] Appl. No.: 901,888

[22] Filed: Jun. 19, 1992

[30] Foreign Application Priority Data

Jun. 19, 1991 [KR] Rep. of Korea .................... 91-10259
May 26, 1992 [KR] Rep. of Korea ............. U.M.92-9143

[51] Int. Cl.[5] ........................ G01N 21/00; B65B 37/00

[52] U.S. Cl. .................................... 356/237; 356/239; 356/445; 250/548; 250/572; 198/463.3; 198/345.1

[58] Field of Search ............... 356/237, 239, 371, 445, 356/446, 429, 430, 431; 226/108, 109, 188, 189, 45; 358/106; 198/463.3, 809, 341, 345.1; 250/548, 549, 562, 571, 572

[56] References Cited

U.S. PATENT DOCUMENTS

| | | | |
|---|---|---|---|
| 2,785,785 | 3/1957 | Macaluso | 198/463.3 |
| 3,013,459 | 12/1961 | Coleman | 226/45 |
| 3,072,095 | 1/1963 | Keessen et al. | 198/345.1 |
| 3,353,652 | 11/1967 | Fellner, Jr. | 198/463.3 |
| 4,109,781 | 8/1978 | Moons | 198/463.3 |
| 4,331,228 | 5/1982 | Galarowic | 198/341 |
| 4,463,845 | 8/1984 | Harris | 198/341 |
| 4,585,343 | 4/1986 | Schave et al. | 356/445 |
| 5,024,315 | 6/1991 | Ward | 198/341 |

*Primary Examiner*—Richard A. Rosenberger
*Assistant Examiner*—Hoa Q. Pham
*Attorney, Agent, or Firm*—Francis C. Hand

[57] ABSTRACT

An inspection apparatus is provided to permit an inspector to easily inspect a face plate which has passed through a grinding process for flaws, an alien substance or an unground portion on the face plate surface. The apparatus includes a gate conveyor on which the face plate is conveyed. When the face plate is stopped on the gate conveyor, the sides of the face plate are engaged via padded piston rods and the gate conveyor swung open so as to permit the engaged face plate to be rotated for inspection purposes. Light sources may be positioned above and below the gate conveyor to aid in the inspection of a face plate.

11 Claims, 7 Drawing Sheets

APPARATUS FOR INSPECTING SURFACE OF A FACE PLATE FOR A CATHODE RAY TUBE

FIELD OF THE INVENTION

This invention relates to an apparatus for inspecting a surface of a face plate for a cathode ray tube.

BACKGROUND OF THE INVENTION

A face plate for a cathode ray tube is made by grinding a surface and an edge of a casting produced by pouring gob delivered from a furnace into a mold, pressing and casting the gob.

The quality of the face plate having passed through a grinding process is determined through an inspecting process wherein one checks whether a flaw which may worsen a screen quality exists on the surface of the face plate, whether an alien substance or a bubble is included in the face plate, or whether an unground portion remains on the surface of the plate, or not.

An inspector has no choice but to inspect the surface of the face plate only with his naked eyes, more concretely, the surface inspecting is performed by holding up slantly the face plate as supplied from a conveyor at an angle before a lighting means, and inspecting for a flaw; alien substance or unground part.

This work is quite a difficult one since the inspector has to personally hold up the heavy face plate before the lighting means with his own hands.

The above-mentioned disadvantages can be solved through automatization of the inspecting process.

However, as far as apparatus is not available for detecting a flaw, the alien substance or the unground portion existing in a face plate, it is impossible to automatize the inspecting process, considering the present technical level. Even if it is possible to automatize the inspecting process, any profit is not expected.

SUMMARY OF THE INVENTION

An object of the present invention is to provide an apparatus for inspecting a surface of a face plate for a cathode ray tube constructed to be able to carry out the surface inspecting without pains.

Briefly, the invention provides an apparatus for inspecting a surface of a face plate for a cathode ray tube which includes a frame and a gate conveyor mounted on the frame for conveying a face plate thereon. The conveyor has a pair of sections for receiving a face plate thereon, each of which is pivotally mounted on the frame to move between a conveying position with the face plate thereon and a retracted position spaced from the face plate.

The apparatus also has a pair of chucking cylinders mounted on opposite sides of the frame, each of which has reciprocally mounted rotatable piston therein for movement between a retracted position and an extended position. In addition, a pad is mounted on each piston to engage a side of a face plate on the gate conveyor with each section of the conveyor in the conveying positions thereof and to rotate the face plate about an axis coincident with the pads with the sections of the conveyor in the retracted positions thereof.

The apparatus also has a contact switch for sensing the positioning of a face place on the gate conveyor in a position to be engaged by the pads and emitting a signal to activate the cylinders to move the pistons to the extended positions for engaging a face plate and to move the conveyor sections into the retracted positions.

The apparatus also employs lighting needs on the frame for casting light onto a face plate engaged between the pads. This lighting means includes at least one light source mounted below the gate conveyor and at least one light source mounted above the gate conveyor. In addition, at least one shield may be movably mounted over the lighting means to selectively open and shut the lighting means relative to the face plate.

The apparatus may also have a construction in which rails are positioned on both sides of the frame with sliders mounted on the respective rails. In this construction, each slider receives a cucking cylinder. In addition, a handle is connected in common to the sliders so as to move the sliders and thus, the chucking cylinders, along the rails simultaneously.

As another embodiment of the lighting means, the lighting means may include a pair of light sources of one group, and a pair of shields being capable of opening and shutting the pair of light sources of one group. Also, both pair of shields can be made to be opened and shut synchronously with each other by being connected by a link.

Also, the light source of the lighting means can be covered by a shade plate.

These and other objects and advantages of the invention will become more apparent from the following detailed description taken in conjunction with the accompanying drawings.

BRIEF DESCRIPTION OF THE INVENTION

DESCRIPTION OF THE PREFERRED EMBODIMENTS

Figure 1:
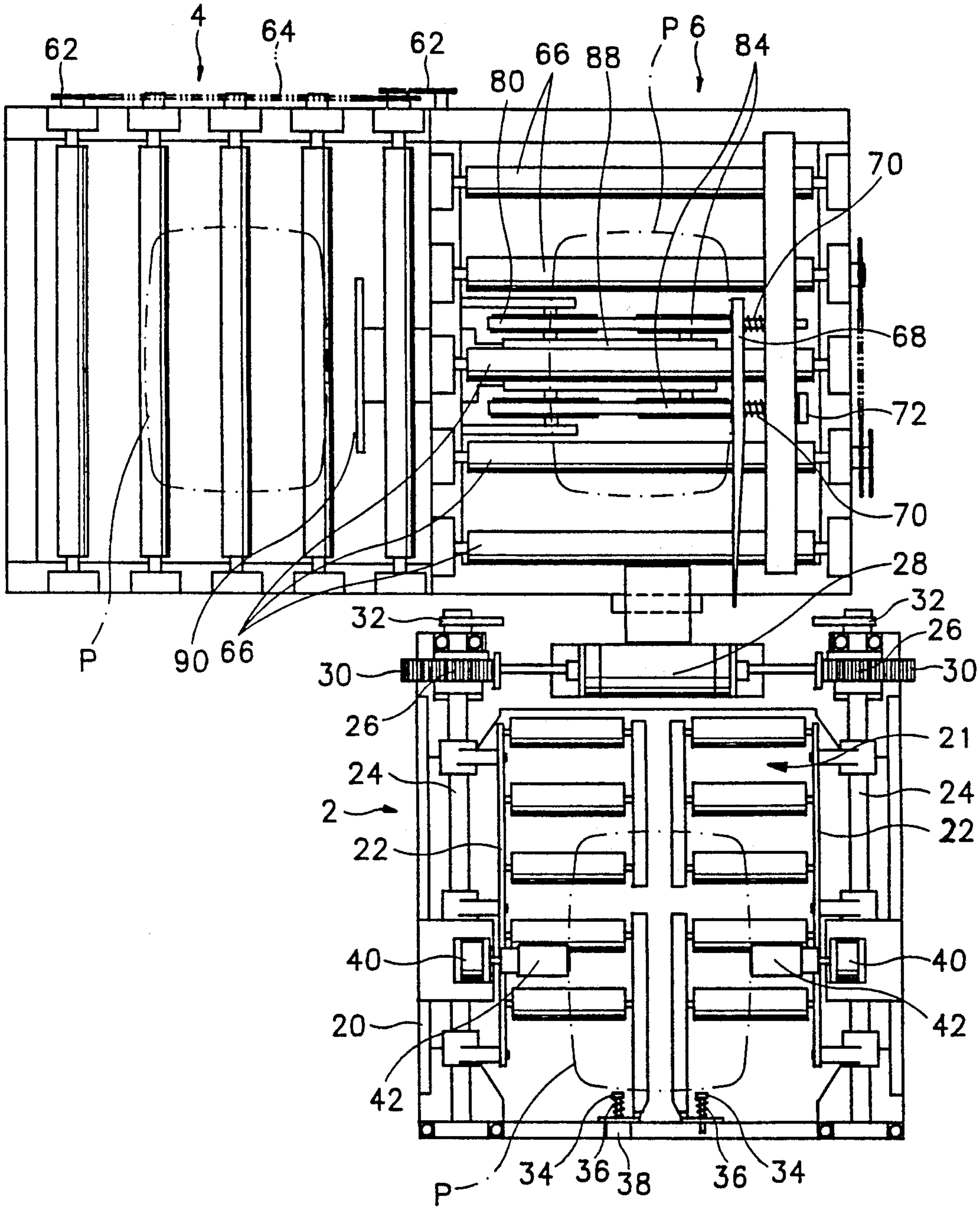
FIG. 1 is a plan view showing an example of an inspecting line having an inspection apparatus according to the invention.

Referring to FIG. 1, the apparatus for inspecting a surface of a ground face plate P for a cathode ray tube includes an inspection table 2 to which the plate P is supplied from a conveyor 4 via a direction change part 6. As described in the above, the inspection table 2 can receive the face plate P from the direction change part 6, since the inspection table 2 is equipped with a gate conveyor 21 which is arranged symmetrically being divided by two lines inside a frame 20.

The gate conveyor 21 has a plurality of rollers which are arranged in two sets in a symmetrical manner. Each set of rollers is rotatably mounted between a pair of ribs 22.

Figure 2:
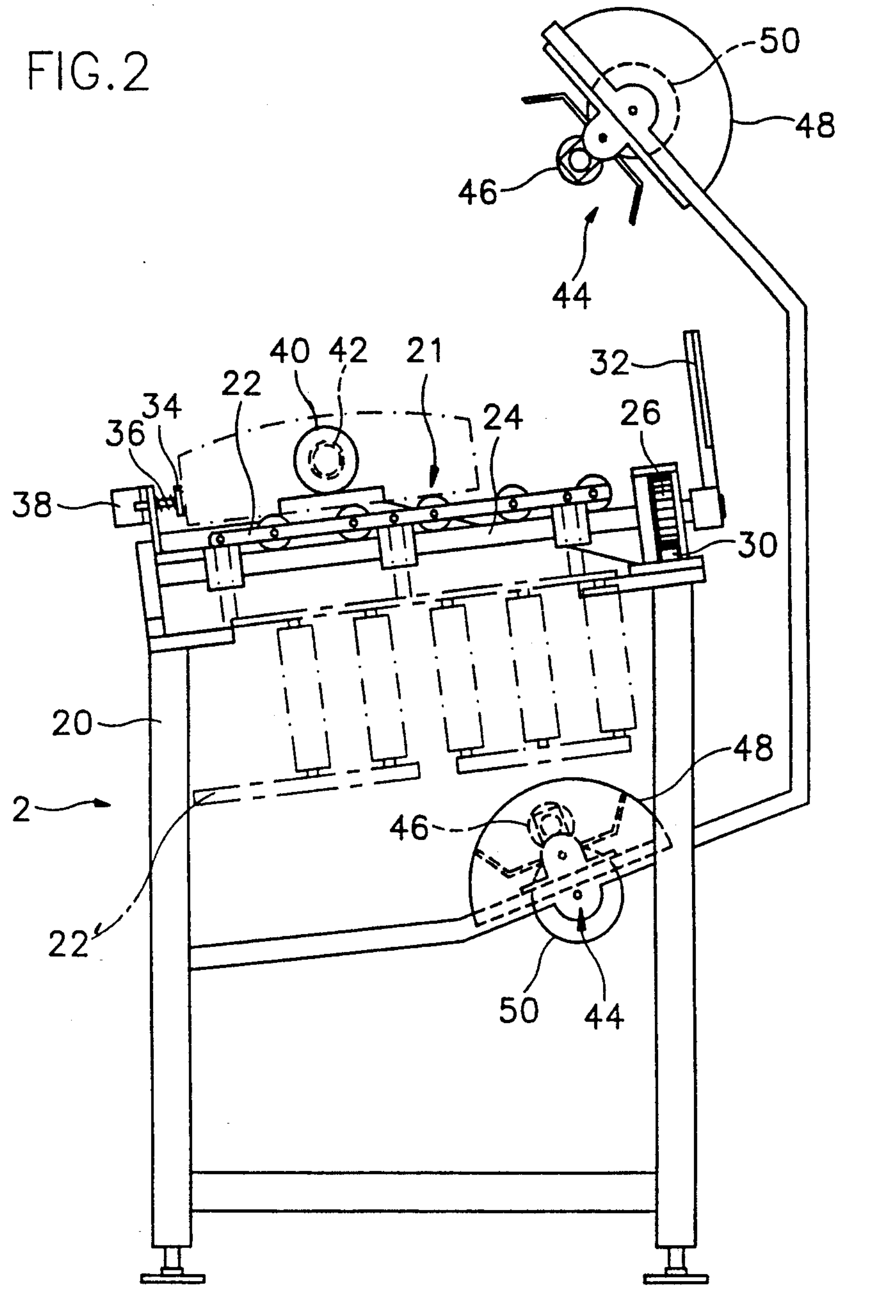
FIG. 2 is a side view of the apparatus of FIG. 1 during and operation state of the inspection apparatus.

Each pair of ribs 22 is respectively connected to a rotary shaft 24 which is able to rotate along a respective side of the inspection table 2 so that the top of the frame can be opened or shut by changing the positions of the sets of rollers between horizontal and vertical as the pair of rotary shafts 24 rotate clockwise and counterclockwise. That is to say, each set of rollers (i.e. section of the gate conveyor 21) is pivotally mounted on the frame of the inspection table 2 to move between a conveying position as shown in solid line in FIG. 2 with a face plate P thereon and a retracted position shown in dotted line in FIG. 2 spaced from the face plate P. As indicated in FIG. 2, the ribs take up the position 22'.

The pair of rotary shafts 24 respectively have a pinion 26 remotely on one side of them, and the respective pinion 26 is engaged with rack gear 30 which is reciprocated by an actuator 28 which is arranged at an inlet of the inspection table 2.

Since a reciprocation of the respective rack gear 30 causes the pinion 26 engaged with the rack gear 30 to rotate clockwise and counterclockwise, as a result, both rotary shafts 24 rotate clockwise and counterclockwise symmetrically.

In this embodiment, a pneumatic cylinder of double piston type is exemplified as the actuator 28, but the actuator 28 is not limited to this.

For example, a pair of actuators can be synchronized with each other, with each actuator being connected with a respective rack gear 30.

Since the gate conveyor 21 takes the face plate P from the direction change part 6, when the gate conveyor 21 is in a position where the top of the inspection table 2 is opened, the gate conveyor 21 should prevent the direction change part 6 from supplying the face plate P to the inspection table 2.

For this, the inlet of the inspection table 2 is blocked by barricades 32 being attached to the ends of both the rotary shafts 24, if the gate conveyor 21 begins to be opened. As indicated in FIGS. 1 and 2, each barricate 32 is disposed at a forward end of the gate conveyor 21 for movement between a retracted position below the conveyor 21 and a raised position, as shown, to block entry of a face plate P onto the conveyor 21. Each barricade 32 is movable into the raised position in response to movement of the conveyor sections into the retracted positions shown in dotted line in FIG. 2.

At least a pair of stoppers 34 for stopping the face plate P supplied from the direction change part 6 at a predetermined position, are set up at an opposite position to inside ends of the pair of ribs 22 in the inspection table 2. Shock is absorbed by the elastic force of springs 36 attached to the stoppers 34, when the stoppers 34 meet the face plate P.

Either of both the stoppers 34 is set up together with a contact switch 38 being turned ON by the shock absorption of the stoppers 34.

Accordingly, if the face plate P is delivered to the gate conveyor 21, is slid toward its end, and is contacted with the stoppers 34, the contact switch 38 generates a electric signal.

The inspection table 2 has a pair of chucking cylinders 40 which are arranged opposite to each other and symmetrically of the middle portions of the face plate P which is stopped on the gate conveyor 21.

A pair of pads 42 for engaging both sides of the middle portions of the face plate P and fixing them are set up to be able to rotate on piston rods of the chucking cylinders 40.

During operation, the pair of chucking cylinders 40 advance according to the electric signal generated by the contact switch 38 being shut, and this advance state is continued for a short time. Continually, the actuator 28 opens the gate conveyor 21.

FIG. 2 is a side view showing the above-described inspection table 2.

A lighting means 44 is set up at a predetermined position around the inspection table 2.

In this embodiment, the lighting means 44 are placed respectively above and under the inspection table 2.

The lighting means 44 is made of an ordinary light source 46 such as a fluorescent lamp or an incandescent lamp, a semicylindrical shield 48 for opening and shutting the light source 46 by circling around the light source 46, and a rotary cylinder 50 for rotating the shield 48 clockwise and counterclockwise in a 180 degree arc.

Figure 3:
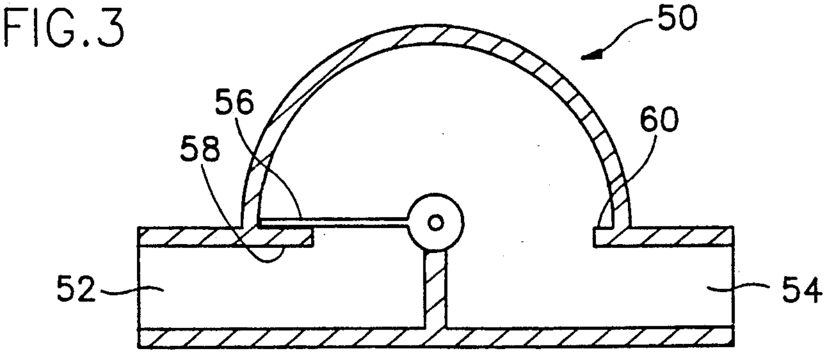
FIG. 3 is a sectional view showing a construction of a rotary cylinder in relation to a lighting means

FIG. 3 illustrates a construction of the rotary cylinder 50 for rotating the shield 48 clockwise and counterclockwise in the 180 degree arc.

The rotary cylinder 50 is operated by an additional button switch (not shown) being worked by an inspector, and has an ordinary construction wherein a vane 56 is placed to be able to rotate between an inlet 52 through which pneumatic power is introduced and an outlet 54.

The shield 48 is rotated by a shaft of the vane 56 being connected to the shield 48.

Also, the limits of rotation of the vane 56 is defined by vane seats 58, 60 formed to be on the same level as each other inside the inlet 52 and the outlet 54.

In the above-stated embodiment, a conveyor 4 is made of a roller conveyor which carries the face plate P, a sprocket 62 being attached substantially to both ends of the conveyor and so, being rotated to the same direction by a chain 64. However, it is not necessary that the roller conveyor is applied as the conveyor 4. For example, a belt conveyor circulating in a double row can be applied thereto.

Also, the direction change part 6 has a plurality of rollers 66 placed to be perpendicular to the conveyor 4, an arm 68 sensing whether the face plate P is carried, or not, return springs 70 to absorb the shock to the arm 68 at the time of the arm meeting the face plate P, and a limit switch 72 being turned ON by the arm 68.

An additional carrier 74 is needed for the face plate P being transferred from the conveyor 4 to the direction change part 6, because the rollers of the conveyor 4 and the rollers of the direction change part 6 are crossed in the operation directions thereof.

Figure 4:
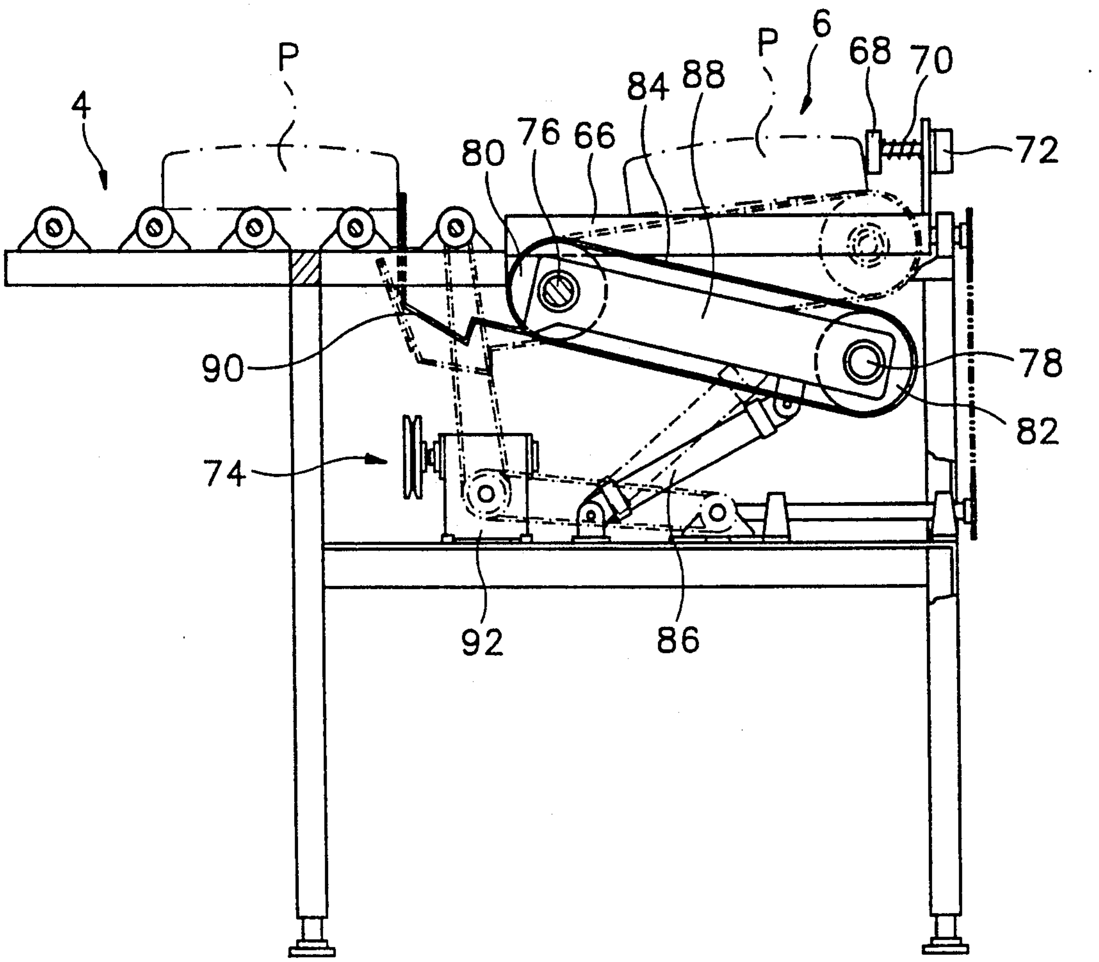
FIG. 4 is a side view of a direction change part of the apparatus of FIG. 1.

FIG. 4 shows the construction of the carrier 74 being place under the direction change part 6.

Carrier 74 has a belt conveyor 84 being built between a pair of pulleys 80, 82 being supported opposite to each other respectively by a fixing shaft 76 and a movable shaft 78.

The fixing shaft 76 and the movable shaft 78 are placed on a plate 88 being operated by a lifter 86, and a stopper 90 is extended from the one side of the plate 88.

As illustrated by a chained line, usually, the lifter 86 makes the plate 88 ascend and maintain the ascended state of the plate 88, and so that the belt conveyor 84 is located at higher position than that of the roller of the direction change part 6. Thus the belt conveyor 84 is pivotally mounted at one end below the rollers of the part 6 while the opposite end is movable between a raised position as shown chain line above the rollers and a lowered position as shown in solid line below the rollers.

The face plate P is transferred to the belt conveyor 84 from the end of the conveyor 4, since the roller of the conveyor 4, the roller of the direction change part 6 and belt conveyor 84, as described, are rotated by power from a driving motor 92 being delivered by a V belt or the chain and the sprocket.

At this time, as the face plate P contacts with the arm 68 and then moves the arm 68, the limit switch 72 is turned ON, and so, the lifter 86 makes the plate 88 descend.

As a result of that the face plate P is delivered to the inspection table 2, being transferred to the rollers 66 and becoming perpendicular to the conveyor 4. In the process of the face plate 2 being delivered, the stopper 90 blocks a successively carried face plate P not to be delivered to the direction change part 6 by being projected to the end of the face plate P.

The direction change part 6 constructed as above is not necessary for the apparatus according to the present invention, only, it is described as the suitable example for an inspecting line wherein the inspection line 2 is arranged to be perpendicular to the conveyor 4.

Of course, the inspection table 2 can be placed at the end of the conveyor 4 to be coaxial with the conveying direction of the conveyor 4.

After the face plate P transferred to the direction change part 6 is slid, riding on the gate conveyor 21 of the inspection table 2, the face plate P is stopped, contacting with the stopper 34. The stopper 34 receives a weight of the face plate P and so, the contact switch 38 is turned ON. As a result of that, the chucking cylinders 40 are activated to move the piston rods from the retracted positions to the extended positions to pinch both middle portions of the stopped face plate P by making pads 42 advance.

Figure 5:
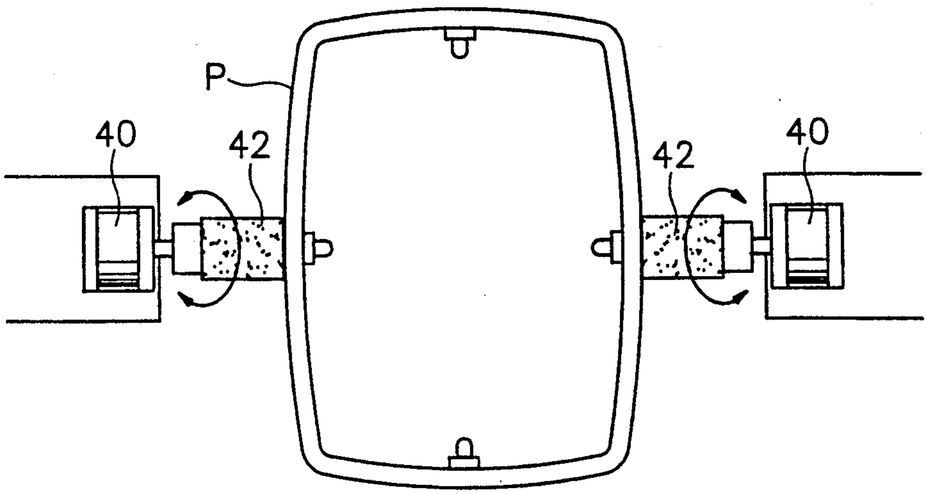
FIG. 5 is a plan view partially illustrating a temporary fixation state of a face plate shown in FIG. 2.

While the electric signal of the contact switch 38 is that of the chucking cylinder 40, after the electric signal of the contact switch 38 pauses, this electric signal is generated as the operation signal of the actuator 28. As a result of that, as illustrated by the chained line in FIG. 2, the gate conveyor 21 is opened and the face plate P is temporarily fixed only by the pads 42 of the chucking cylinder 40. Accordingly, as shown in FIG. 5, the inspector can rotate the face plate P in the direction indicated by the arrows.

On the other hand, since the inlet of the inspection table 2 is blocked by the barricade 32, a next face plate P being transferred to the direction change part 6 can not be supplied to the inspection table 2.

If the inspector wish to release the face plate P from the pads 42, the inspector can do so by operating a reset switch (not shown) and so that the chucking cylinders 40 are activated to retract the piston rods, and thus the pads 42 to the retracted positions.

The inspecting process in accordance with the present invention can be carried out as follows.

If the face plate P is provided intermittently, riding on the conveyor 4, the face plate 88 is in the position of being ascended because the lifter 86 is advancing.

Accordingly, simultaneously with the arm 68 entering into the direction change part 6 easily, the face plate P contacts with the arm 68 by being moved, riding on the belt conveyor 84 located at the higher position than that of the roller 66.

Since the arm 68 turns ON the limit switch 72, reducing the return spring 70 by the weight of the face plate P, the lifter 86 recedes and so makes the plate 88 descend.

Thus, simultaneously with the belt conveyor 84 descending to the lower position than that of the rollers 66, the stopper 90 remotely on one side of the plate 88 ascends and blocks the outlet of the conveyor 4.

As a result, the face plate P delivered to the direction change part 6 is turned over to the inspection table 2, riding on the rollers 66.

Since the actuator 28 shuts the gate conveyor 21 and stands by, the face plate P delivered from the direction change part 6 is contacted with the stopper 34 by being slid, riding on the gate conveyor 21.

If the weight of the face plate P is given to the stopper 34, the contact switch 38 is turned ON and the piston rods of the chucking cylinder 40 advance. And after a predetermined time passes by, the actuator 28 is operated and the gate conveyor 21 is opened.

The pads 42 pinch both middle portions of the face plate P and fix them temporarily by the advance of the piston rods of the chucking cylinders 40. Subsequently as shown by the chained line in FIG. 2, the gate conveyor 21 is opened to the under direction and the inlet of the inspection table 2 is blocked by the barricade 32. At the same time, the face plate P is supported to be rotated on the axis of the pads 42.

If it is necessary during the inspection, the inspector can selectively light the lighting means 44.

Also, if needed, the inspector can selectively block the light of the lighting means 44 by the shield 48, by working the rotary cylinder 50.

If the inspection is done, the inspector operates the reset switch (not shown). Then, the actuator 28 and the chucking cylinder 40 are reversely operated by turns. So, the gate conveyor 21 is shut, and next, the pads 42 release the face plate P.

The inspector takes out the released face plate P and supplies it for a next wrapping process or a bulb production process, and inspects the next face plates P sequentially.

Figure 6:
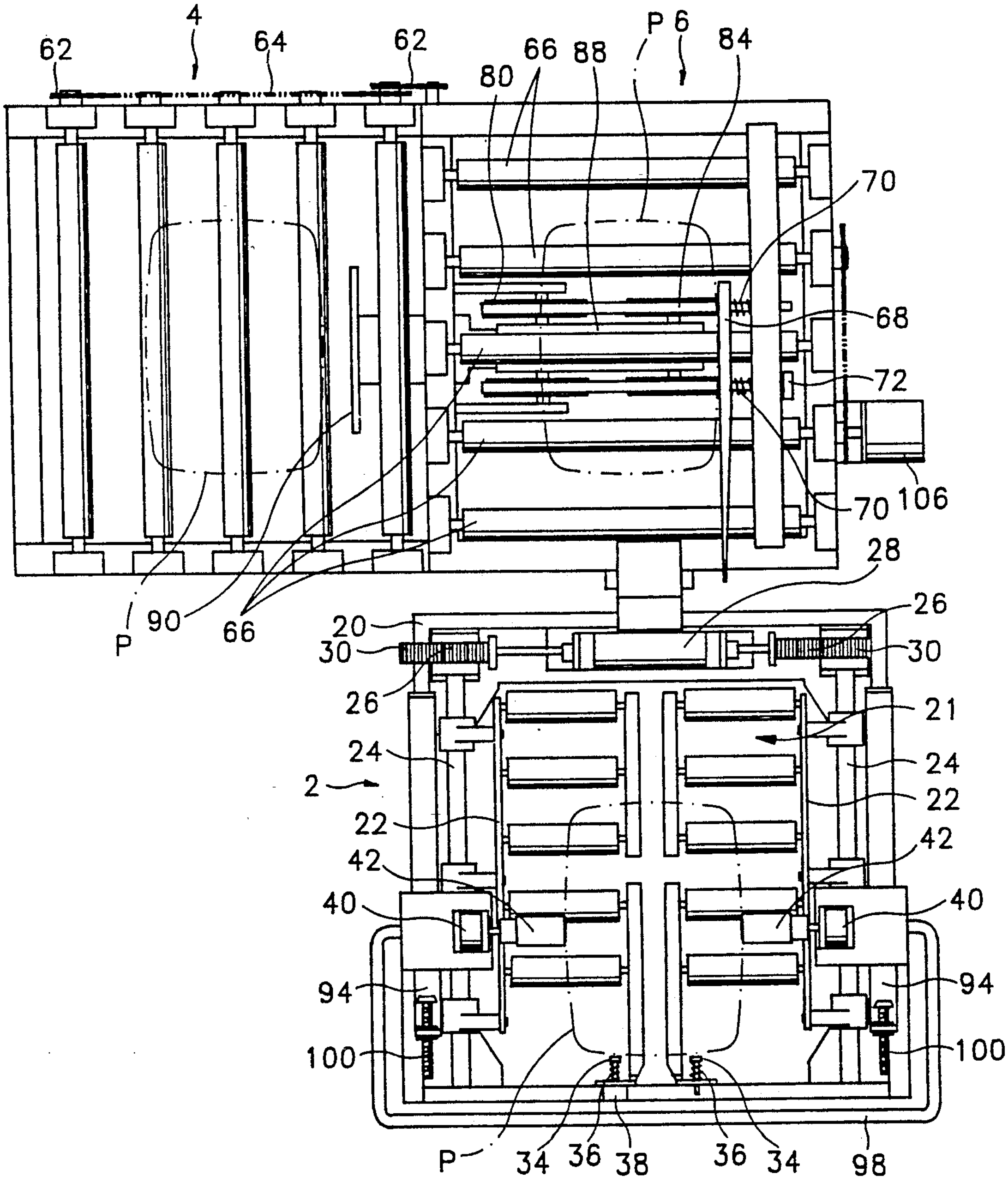
FIG. 6 is a plan view corresponding to FIG. 1 as of another embodiment of an inspection apparatus according to the invention.

FIG. 6 is a plan view showing another embodiment of an inspection table 2 related to the present invention.

The barricade is not set up at the inspection table 2 illustrated in this embodiment.

Also, rails 94 are built on both sides of the top face of the frame 20. In addition, sliders 96 are placed to be able to slide on the rails, and the pair of chucking cylinders 40 is set up opposite to both sliders 96.

Both sliders 96 are united by the handle 98 to be able to travel together on the rails 94.

A moving distance can be defined by an adjustable bolt 100 being placed on the ends of both rails 94.

According to this embodiment, the inspector can change the position of the face plate P temporarily fixed by the pads 42 of the chucking cylinders 40, by taking hold of the handle 98 and moving the sliders 96 and, thus, the cylinders 40.

Since this change of the position causes the position of the face plate P to be adjusted for the lighting means 44, there is provided an advantage whereby the inspector can inspect the face plate P, moving the face plate P to the position most clearly recognized, in inspecting the face plate P with his naked eyes.

Figure 7:
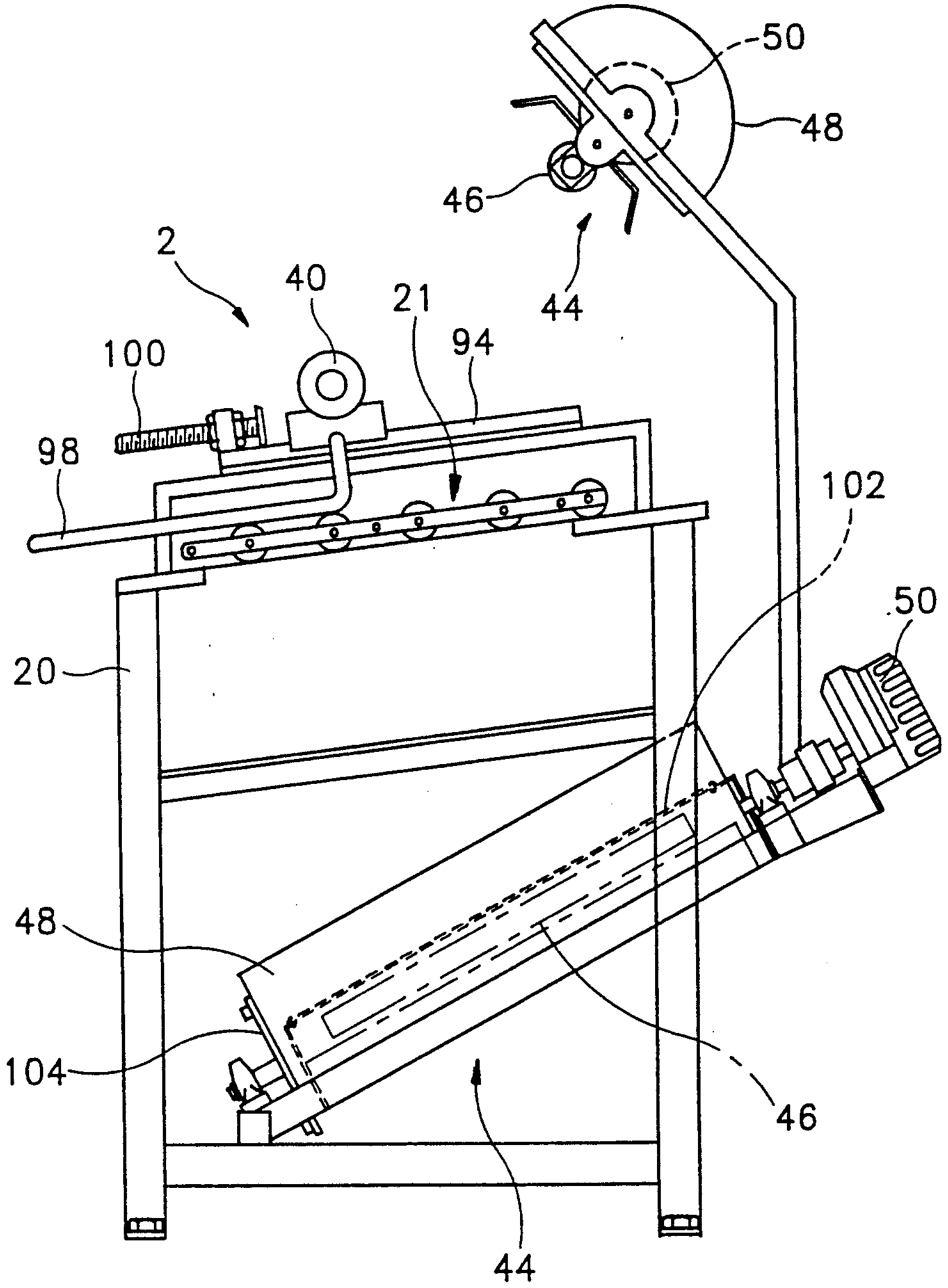
FIG. 7 is a side view of the inspection table shown in FIG. 6.
Figure 8:
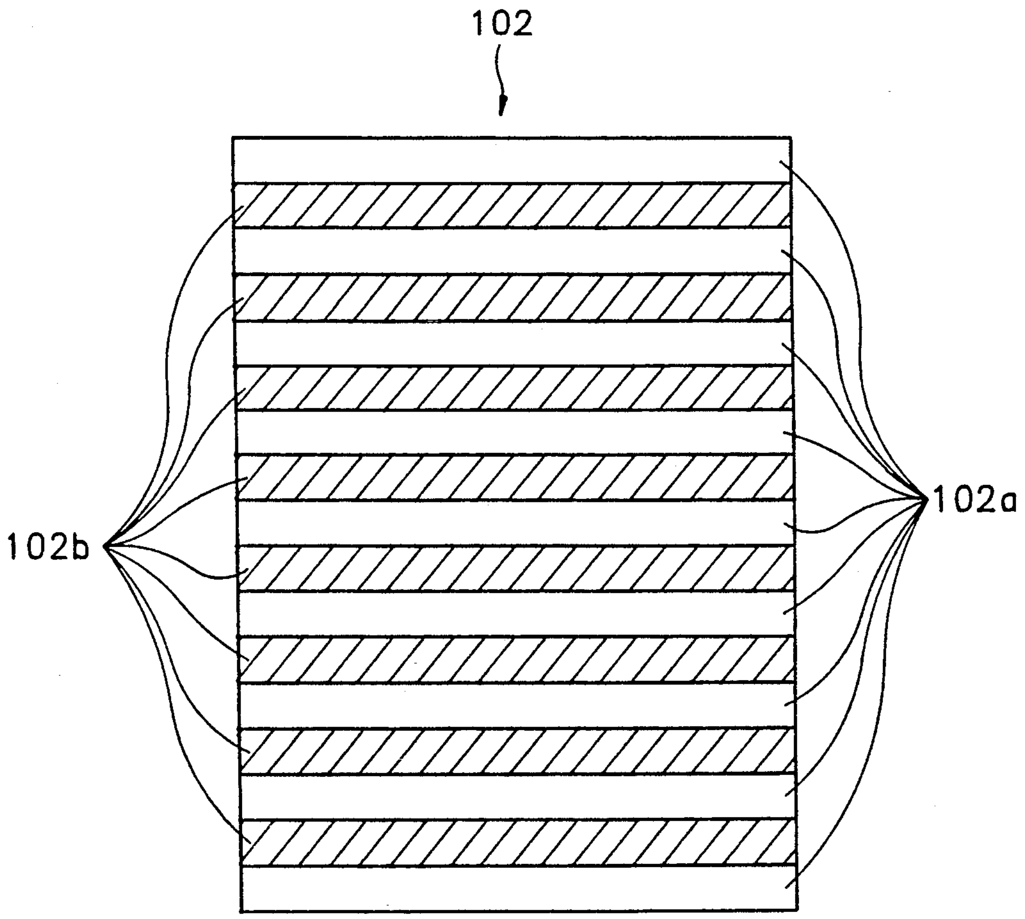
FIG. 8 is a plan view illustrating a shade plate shown in FIG. 7.

FIG. 7 illustrates another embodiment of the lighting means 44 particularly placed under the inspection table 2 according to the present invention.

In this embodiment, the lighting means 44 has a pair of light sources 46 being placed side by side, and a pair of shields 48 are covered around these light sources 46.

A shade plate 102 is intervened between the light sources 46 and the shields 48.

The shade plate 102 has a pattern whereby a bright portion of white 102*a* alternates with a dark portion of black 102*b*.

Therefore, the light of the light source 46 is projected only through the bright portion 102*a* of the shade plate 102, so, the inspector does not suffer a flickering of the light. Also, the inspector can clearly observe an inspection portion of the face plate P due to an extreme contrast of brightness and darkness between the bright portion 102*a* and the dark portion 102*b*.

The pair of shields 48 are constructed to be opened and shut by a single rotary cylinder 50 simultaneously.

Figure 9:
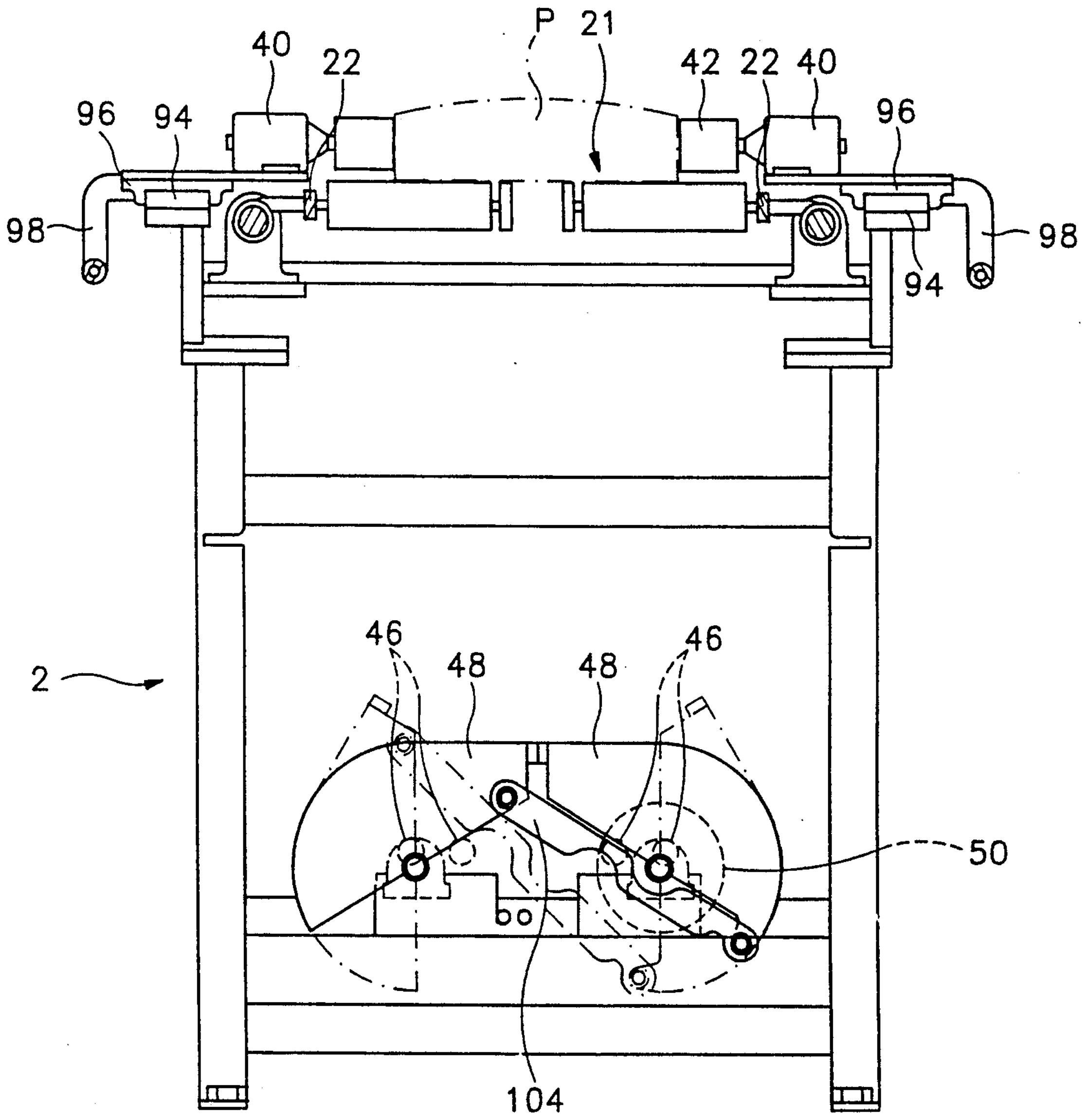
FIG. 9 is a front view illustrating a synchronous open-shut shut construction of a shield in a lighting means.

FIG. 9 shows the construction for a simultaneous opening and shutting of both shields 48.

The rotary cylinder 50 is connected only to the right shield 48 in FIG. 9. But as illustrated by the chained line, since a link 104 is connected between the lower portion of the right shield 48 and the upper portion of the left shield 48, if the right shield is opened, the left shield is also opened because the link 104 pushes away the upper portion of the left shield 48.

It is necessary to prevent the direction change part 6 from providing the face plate P excessively, because the inspection table 2 described as another embodiment according to the present invention has no barricade 32.

As the direction change part 6 illustrated in FIG. 6, this problem can be solved by a motor 106 being operated and being not operated by a limit switch 72 turned ON when the face plate P meets the arm 68, the sprocket of the roller 66 being driven by the additional motor 106 are activated to drive a plurality of the rollers 66.

As described in the above, the present invention has an advantage whereby the inspector can inspect the surface of the face plate P without difficulties, since the inspector can inspect the face plate P without holding up every heavy face plate P in examining the surface of the ground face plate P.

What is claimed is:

1. An apparatus for inspecting a surface of a face plate for a cathode ray tube, said apparatus comprising a frame;

a gate conveyor mounted on said frame for conveying a face plate thereon, said conveyor having a pair of sections for receiving a face plate thereon, each said section being pivotally mounted on said frame to move between a conveying position with the face plate thereon and a retracted position spaced from the face plate;

a pair of chucking cylinders mounted on opposite sides of said frame, each said cylinder having a reciprocally mounted rotatable piston therein for movement between a retracted position and an extended position;

a pair of pads, each pad being mounted on a respective piston to engage a side of a face plate on said gate conveyor with said sections of sad conveyor in said conveying positions thereof and to rotate the face plate about an axis coincident with said pads with said sections of said conveyor in said retracted positions thereof; and a contact switch for sensing the positioning of a face plate on said gate conveyor in a position to be engaged by said pads and emitting a signal to activate said cylinders to move said pistons thereof to said extended positions thereof and to said conveyor to move said sections thereof into said retracted positions thereof.

2. An apparatus as set forth in claim 1 which further comprises lighting means disposed on said frame for casting light onto a face plate engaged between said pads.

3. An apparatus as set forth in claim 2 wherein said lighting means includes at least one light source mounted below said gate conveyor and at least one light source mounted above said gate conveyor.

4. An apparatus as set forth in claim 2 which further comprises at least one shield movably mounted over said lighting means to selectively open and shut said lighting means relative to the face plate.

5. An apparatus as set forth in claim 1 which further comprises a stopper on said frame for arresting movement of a face plate along said gate conveyor.

6. An apparatus as set forth in claim 1 which further comprises a barricade at an end of said gate conveyor for movement between a retracted position below said conveyor and a raised position to block entry of a face plate onto said conveyor, said barricade being movable into said raised position in response to movement of said conveyor sections into said retracted positions thereof.

7. An apparatus as set forth in claim 1 which further comprises a pair of rails on said frame, each rail having a respective chucking cylinder slidably mounted thereon, and a handle connected in common to said cylinders to move said cylinders along said rails simultaneously.

8. An apparatus as set forth in claim 1 which further comprises a direction change part for directing a face plate onto said gate conveyor, said part including a plurality of rollers for receiving and directing a face plate towards said gate conveyor; a belt conveyor disposed transversely of said rollers for conveying a face plate onto said rollers, said belt conveyor being pivotally mounted at one end below said rollers and having an opposite end movable between a raised position above said rollers and a lowered position below said rollers; and a lifter for moving said opposite end of said belt conveyor between said positions thereof.

9. An apparatus as set forth in claim 8 which further comprises a stopper mounted at one end of said part for movement between a retracted position below said rollers and a raised position above said rollers, said stopper being responsive to movement of said opposite end of said belt conveyor into said raised position thereof to move into said raised position above said rollers to block entry of a face plate onto said part.

10. An apparatus as set forth in claim 1 which further comprises a pair of light sources disposed below said gate conveyor for directing light onto a face plate engaged by said pads and a pair of shields, each shield being disposed over a respective light source, and means for simultaneously moving said shields relative to said light sources.

11. An apparatus as set forth in claim 10 which further comprises a shade plate between at least one light source and a respective shield, said shade plate having a plurality of parallel slots for passage of light form said respective light source.

* * * * *

UNITED STATES PATENT AND TRADEMARK OFFICE
CERTIFICATE OF CORRECTION

PATENT NO. : 5,305,080

DATED : April 19, 1994

INVENTOR(S) : Sangsoo Lee, et al

It is certified that error appears in the above-identified patent and that said Letters Patent is hereby corrected as shown below:

Column 1, line 57 after "has" insert -a-

Column 2, line 38 change "and" to -an-

Column 7, line 37 change "are activated" to -so as-

Line 64 change "sad" to -said-

Column 8, line 66 change "form" to -from-

Signed and Sealed this

Second Day of August, 1994

Attest:

BRUCE LEHMAN

*Attesting Officer*

*Commissioner of Patents and Trademarks*